(12) United States Patent
Prokop et al.

(10) Patent No.: US 8,964,508 B2
(45) Date of Patent: Feb. 24, 2015

(54) DEVICE FOR AND METHOD OF REPELLING ANIMALS

(75) Inventors: Andreas Prokop, Halle (DE); Thorsten Menke, Bad Iburg (DE)

(73) Assignee: W. Neudorff GmbH KG, Emmerthal (DE)

( * ) Notice: Subject to any disclaimer, the term of this patent is extended or adjusted under 35 U.S.C. 154(b) by 203 days.

(21) Appl. No.: 13/638,805

(22) PCT Filed: Apr. 4, 2011

(86) PCT No.: PCT/EP2011/055220
§ 371 (c)(1),
(2), (4) Date: Nov. 28, 2012

(87) PCT Pub. No.: WO2011/124557
PCT Pub. Date: Oct. 13, 2011

(65) Prior Publication Data
US 2013/0070564 A1  Mar. 21, 2013

(30) Foreign Application Priority Data
Apr. 6, 2010 (GB) .................................. 1005701.6

(51) Int. Cl.
*A01M 29/16* (2011.01)
(52) U.S. Cl.
CPC ..................................... *A01M 29/16* (2013.01)
USPC ........................................................ 367/139
(58) Field of Classification Search
CPC ...................................................... A01M 29/16
USPC ........................................................ 367/139
See application file for complete search history.

(56) References Cited

U.S. PATENT DOCUMENTS

| 4,943,953 A | 7/1990 | Kafi |
| 5,822,917 A | 10/1998 | Jan |

(Continued)

FOREIGN PATENT DOCUMENTS

| BE | 892117 A2 | 5/1982 |
| DE | 23 52 987 A1 | 4/1975 |

(Continued)

OTHER PUBLICATIONS

Gattermann, R, Bioakustik (animal bioacoustics): The science of using sound in connection with animals and the effect of sound on anaimals. "Wörterbuch zur Verhaltensbiologie der Tiere und des Menschen," 2nd edition, 2006, p. 45. Spektrum Akademischer Verlag, Berlin.

(Continued)

*Primary Examiner* — Daniel Pihulic

(57) ABSTRACT

A weather-resistant housing (1 *a*, 1 *b*) provides a chamber (1 *b*) containing an acoustic generator. An acoustic outlet (2) is located, in use, to direct an acoustic signal into air of the animal tunnel/burrow system rather than into ground/soil. The acoustic outlet may be an acoustic tube that extends along a tunnel of a subterranean tunnel system of the species to be deterred so as to form part of that tunnel. The device may be powered by a battery (10). A part of the device that extends above the ground may support a solar panel (5). The acoustic signal represents one or more deterrent communication calls of the species to be deterred. In the case of a water vole or mole, the acoustic signal represents one or more of a distance regulating or territorial call and a defensive call. Two such communication calls may be artificially paired to form the acoustic signal.

12 Claims, 7 Drawing Sheets

(56) References Cited

U.S. PATENT DOCUMENTS

| | | | |
|---|---|---|---|
| 6,000,169 | A | 12/1999 | Jan |
| 6,157,594 | A | 12/2000 | Jan |
| 2008/0156279 | A1 | 7/2008 | Weiser et al. |
| 2009/0274007 | A1 | 11/2009 | Weiser et al. |
| 2013/0070564 | A1 * | 3/2013 | Prokop et al. ............ 367/139 |

FOREIGN PATENT DOCUMENTS

| | | | |
|---|---|---|---|
| DE | 31 51 008 | A1 | 7/1983 |
| DE | 32 29 904 | A1 | 2/1984 |
| DE | 33 36 813 | A1 | 5/1984 |
| DE | 34 03 146 | A1 | 8/1985 |
| DE | 36 06 866 | A1 | 10/1986 |
| DE | 36 24 489 | C1 | 5/1987 |
| DE | 40 21 892 | A1 | 3/1991 |
| DE | 296 21 718 | U1 | 4/1997 |
| DE | 297 20 705 | U1 | 3/1998 |
| DE | 299 09 159 | U1 | 9/1999 |
| DE | 299 13 473 | U1 | 11/1999 |
| DE | 102 41 835 | A1 | 3/2004 |
| DE | 203 19 735 | U1 | 3/2004 |
| DE | 20 2005 010 921 | U1 | 9/2005 |
| DE | 20 2005 012 354 | U1 | 10/2005 |
| DE | 20 2005 012 757 | U1 | 10/2005 |
| DE | 10 2005 005 458 | A1 | 8/2006 |
| DE | 20 2010 016 553 | U1 | 2/2011 |
| EP | 0 150 339 | A2 | 8/1985 |
| EP | 0 664 079 | A1 | 7/1995 |
| FR | 2775160 | A1 | 8/1999 |
| GB | 2192300 | A | 1/1988 |
| GB | 2323009 | A | 9/1998 |
| WO | 94/06287 | A1 | 3/1994 |
| WO | WO 2011124557 | A1 * | 10/2011 |

OTHER PUBLICATIONS

Pelz, HJ, The effectiveness of ultrasonic devices to repel water voles (*Arvicola terrestris*). [Zur Wirksamkeit von Ultraschallgeraten zur Abwehr von Schermausen (*Arvicola terrestris*)] Nachrichtenblatt des Deutschen Pflanzenschutzdienstes. 1984, vol. 36, pp. 173-174.

Pelz, H.J., Can voles be repelled by sound waves? [Mit schallwellen gegen wuhlmause?] Landwirtschaftliches Wochenblatt Westfalen-Lippe. vol. 8, 1985, 3 pages.

Pelz, H.J., Sound waves don't bother rodents: Poison and traps are still the best way of controlling rodents. [Um schall scheren sich nager wenig: Die besten bekampfungsmethoden bleiben gift und fallen.] Bayerisches Landwirtschaftliches Wochenblatt. 1986;176(7):16-17.

Pelz, H.J., Can voles be repelled by sound waves? [Mit schallwellen wuhlmause vertreiben?] Landwirtschaftliches Wochenblatt Westfalen-Lippe. vol. 47, 1987. 2 pages.

Pelz, H.J., Sound waves for controlling voles—even newer devices don't work. [Schallwellen gegen wuhlmause—auch neuere gerate bewirken nichts.] Top Agrar. vol. 4, 1988, p. 137.

Voland, E., "Grundiss der Soziobiologie," 2nd edition, 2000, 10 pages. Spektrum Akademischer Verlag, Berlin. Translation is of p. 267, paragraph 3.

International Search Report and Written Opinion mailed Jun. 24, 2011 for Application No. PCT/EP2011/055220 (11 Pages).

United Kingdom Search Report issued Nov. 5, 2010 for Application No. GB1005701.6 (3 Pages).

United Kingdom Office Action issued Jan. 11, 2011 for Application No. GB1005701.6 (3 Pages).

United Kingdom Office Action issued Mar. 27, 2012 for Application No. GB1005701.6 (2 Pages).

\* cited by examiner

DEVICE FOR AND METHOD OF REPELLING ANIMALS

This application claims priority of UK Patent Application No 1005701.6 filed 6 Apr. 2010, the whole contents of which are hereby incorporated by reference.

The present invention relates to a device for and a method of repelling animals such as rodents from an area, for example for repelling tunneling animals such as water voles (*Arvicola amphibious*, formerly *Arvicola terrestris*) or moles (*Talpa europaea*).

The use of sound or vibration to repel animals has previously been proposed. Various devices have been proposed in which a stake is driven into the ground and a generator within or attached to the stake produces sounds or vibrations which are transmitted through the ground. Thus, as examples, U.S. Pat. No. 5,822,917 describes a mole chaser having a stem carrying a motor driven vibrator which generates audio frequency vibrations which are transmitted through the ground to drive away moles whilst DE 20 2005 012 354 U1 describes a closed pipe which is driven into the ground. The pipe of DE 20 2005 012 354 U1 contains a clapper which is driven by a wind-driven impeller to hit the inner surface of the pipe to create a vole frightening noise.

In the above examples, a part of the device is driven into the ground and the sound or vibrations generated by the device are transmitted through the ground. The ground surface structure into which the device is driven will be formed of particulate matter (for example dirt, soil, clay, sand or any combination of these) and inevitably there will be air gaps or spaces amongst the particulate matter. The sound waves or vibrations emitted by the device into the ground are absorbed and/or and reflected by the particles of the particulate matter and by the spaces or air gaps between the particles. Such reflection results in a multitude of overlapping amplitudes which can destructively interfere, ultimately leading to the elimination of the wave signal. Accordingly, the acoustic signal may achieve a range of only a few centimeters, with the exact range depending on the precise nature (particulate and air gap sizes and particulate composition, for example) of the material forming the ground into which the device is driven.

Generally, commercially available devices emit a beeping sound or sounds which may or may not initially frighten an animal away. Even if initially frightened away or startled by the sound, an animal may become accustomed to the sound and become less afraid. Also, even frequencies that the animal would find unpleasant may be tolerated due to their short range of effectiveness because of the above-mentioned destructive interference. Therefore, such devices may be ethologically ineffective. This is illustrated by repeated trials discussed in various publications by Pelz (Pelz, H. J. (1985) "Mit Schallwellen gegen Wühlmäuse?", Landwirtschaftliches Wochenblatt Westfalen-Lippe, Vol. 8, Pelz, H. J. (1986) "Um Schall scheren sich die Nager wenig", Bayerisches Landwirtschaftliches Wochenblatt, Vol. 176, page 16-17, Pelz, H. J. (1987), "Mit Schallwellen Wühlmäuse vertreiben?", Landwirtschaftliches Wochenblatt Westfalen-Lippe, Vol. 47, Pelz, H. J. (1988), "Schallwellen gegen Wühlmäuse—auch neue Geräte bewirken nichts", Top Agrar, Vol 4 of tests with the Julius Kuehn-Institut, JKI (formerly Biologische Bundesanstalt, BBA). Devices such as those described in DE 20 2005 012 354 U1 showed no vole-deterring effect in said trials.

An aspect of the present invention provides a device for repelling members of a given animal species, for example a species of rodent, which device is designed to emit sounds mimicking one or more communication calls of the animal that would cause the animal to be deterred or inhibited from approaching the source of the call.

An embodiment provides a device for deterring members of a particular animal species, for example a species of rodent, from a particular location, which device is configured to emit an acoustic signal that mimics a communication call or calls of the species concerned, which communication call(s) deter(s) or inhibit(s) members of that species from entering or staying within range of that acoustic signal.

In an embodiment, the sound or acoustic signal emitted by the device inherently contains acoustic information that inhibits an individual of the species from approaching the source of the sound. In contrast, the previously proposed devices discussed above include no acoustic information for the recipient animal but require that the animal to be deterred somehow be "trained" to be deterred by that sound or simply be alarmed or startled by the noise. Training an animal to experience a sound or sounds as a deterrent is practically impossible; it requires individual conditioning for each individual animal and would have to be reinforced from time to time to prevent that animal becoming used to, and so no longer afraid of or deterred by, the sound.

An embodiment uses an acoustic signal which is an amplified version of a recorded communication call or calls of the species to be deterred. The recording may be obtained by deliberately provoking an animal of the species to produce that call or calls. As another possibility, a synthesized version of the communication call or calls may be used, or specific calls may be downloaded from an appropriate data base of calls.

In an embodiment, the recorded or synthesized call or calls of the animal to be deterred are amplified and processed to provide a continuous loop acoustic signal.

In an embodiment, the device has an acoustic unit containing a data store storing the acoustic signal.

In an embodiment the acoustic signal may be stored in any appropriate format, for example in the WAV format. The acoustic signal may be stored in a compressed format. Any suitable lossy or lossless compression format may be used. In an embodiment, the acoustic signal is stored as an MP3 audio data file.

In an embodiment, the device is configured to be placed in a subterranean tunnel of the species to be deterred so as to direct sound directly into the tunnel system without the sound having to pass through the surrounding ground.

In an embodiment, the device comprises a hollow acoustic tube that is configured to fit into a subterranean tunnel system so that a passage through the acoustic tube extends along a part of a tunnel of the subterranean system and the passage through the acoustic tube of the device becomes a part of said subterraneous tunnel. The passage may allow the animal to pass through or at least into the acoustic tube. For example, the hollow tube may have an internal cross-sectional area similar to that of a tunnel of the subterranean tunnel system.

In an embodiment, the acoustic tube may have a passage with a diameter of from about 40 mm to about 80 mm, for example 55 mm. In an embodiment, the device is L-shaped. In another embodiment, the device is T-shaped.

In an embodiment, the device is configured to emit the acoustic signal into a tunnel of a subterranean tunnel system of the species concerned. In an example, the device may be configured to emit the acoustic signal at a 90° angle into a tunnel.

As another possibility, the device may comprise a closed tube or rod that has apertures through which sound waves may be emitted directly into a subterranean tunnel system when the closed tube or rod is inserted into a tunnel of that subterranean tunnel system.

In an embodiment, functional components of the acoustic generator are provided on a circuit board.

In an embodiment, the device has a loudspeaker arranged to emit an amplified acoustic signal into a subterranean tunnel. The loudspeaker may be preferably a metal calotte (encased) loudspeaker.

In an embodiment where the device is located so as to emit sound directly into the subterranean tunnel system of the species to be deterred, the acoustic signal emitted by the device travels further than it would if it were being directed into the surrounding ground or earth. The emitted sound may cause an animal to leave that subterranean tunnel system and to relocate to a different place within the habitat, where it may dig a new subterranean tunnel system.

In an embodiment, the device is battery powered. In an embodiment, a solar unit or panel is provided to provide a power supply to be derived during hours of sunlight. Solar energy may be used directly to power the device and/or may be used to charge an accumulator or rechargeable battery. The device may have both a battery and the option of solar power with, for example, the battery providing a power supply at night. As another possibility or additionally, a locally fixed accumulator may be provided.

In an embodiment, a low-voltage coupling is provided to enable the device to be powered via a weather-resistant power supply.

In an embodiment, a circuit board installed at an upper end of the device couples to the power supply.

In an embodiment, exposed surfaces of the device, that is its housing, comprise a weather-resistant plastics material that is resistant to damage or is virtually unbreakable.

In an embodiment, the device is configured to emit an acoustic signal that is or represents a distance-regulating sound specific to the water vole (*Arvicola amphibious*, formerly *Arvicola terrestris*) or mole (*Talpa europaea*).

In an embodiment, the device is configured to emit an acoustic signal that comprises or represents at least one of a defensive sound/calls (for example short sounds/calls) and a territorial sound (for example teeth grinding) of a water vole.

An aspect of the invention provides a method of deterring or repelling a mole from a particular location which method comprises emitting a call sound or sounds characteristic of the mole.

An aspect of the invention provides a method of deterring or repelling a mole from a particular location which method comprises providing an acoustic signal which is an amplified version of a recorded communication call or calls of the species to be deterred. The recording may be obtained by deliberately provoking an animal of the species to produce that call or calls. As another possibility, a synthesized version or a download from an "animal acoustic archive" of the communication call or calls may be used.

In an embodiment, the recorded or synthesized call or calls of the animal to be deterred are amplified and processed to provide a continuous loop acoustic signal emitting artificially paired call sounds characteristic of a vole or a mole. The artificially paired or combined calls may be different deterrent calls of the same species. For example the defensive and territorial calls of a water vole or of a mole may be combined in a single acoustic signal so that the different calls occur one after another or in a set sequence or in a random sequence in the combined signal.

An aspect of the invention provides a method of deterring or repelling a water vole from a particular location, which method comprises emitting call sounds characteristic of the water vole.

An aspect of the invention provides a method of deterring or repelling a water vole from a particular location, which method comprises emitting artificially paired call sounds characteristic of the water vole.

An aspect of the invention provides a method of deterring or repelling an animal from at least a tunnel of a subterranean tunnel system, which method comprises emitting a call sound characteristic of a deterrent call sound of that animal directly into a part of a tunnel of that subterranean tunnel system.

An aspect of the invention provides a method of deterring or repelling a water vole from a particular location, which method comprises emitting an amplified acoustic signal characteristic of the defense calls and the territorial sounds of a water vole.

An aspect of the invention provides a method of deterring or repelling a mole from a particular location, which method comprises emitting an amplified acoustic signal characteristic of the defense calls and the territorial sounds of a mole.

An aspect of the invention provides a method of deterring or repelling an animal from at least a tunnel of a subterranean tunnel system, which method comprises emitting a deterrent call sound characteristic of that animal directly into a part of a tunnel of that subterranean tunnel system.

In an example of a method of installing a device embodying the invention, a sectional opening is made in a tunnel of a subterranean tunnel system of the animal to be repelled or deterred, the device is inserted into the opening so that a passage through an acoustic tube of the device extends along the tunnel, and an acoustic generator chamber of the device extends above the ground (to enable its location to be ascertained and to enable use of solar power as a power source, if the device is provided with a solar panel), the opening is then back filled so that the acoustic tube is surrounded by the particulate material (dirt) forming the surface structure where the device is being installed to inhibit the possibility of draft or wind entering the tunnel system. The passage enables an animal that inhabits the subterranean tunnel system to run unhindered through said artificially created tunnel section. This way, the acoustic tube becomes a part of the tunnel system.

As another possibility, the device may be used with the acoustic tube above ground.

Embodiments of the invention have a proven biological behavioral effect. The frequencies emitted provide a warning, recognized by the recipient, to leave the subterranean tunnel system.

Embodiments of the invention can avoid the interference problems of previously proposed devices because the sound waves comprising the acoustic signal are carried by the air in the tunnel system and thus able to spread widely.

Embodiments of the invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Figure 1:
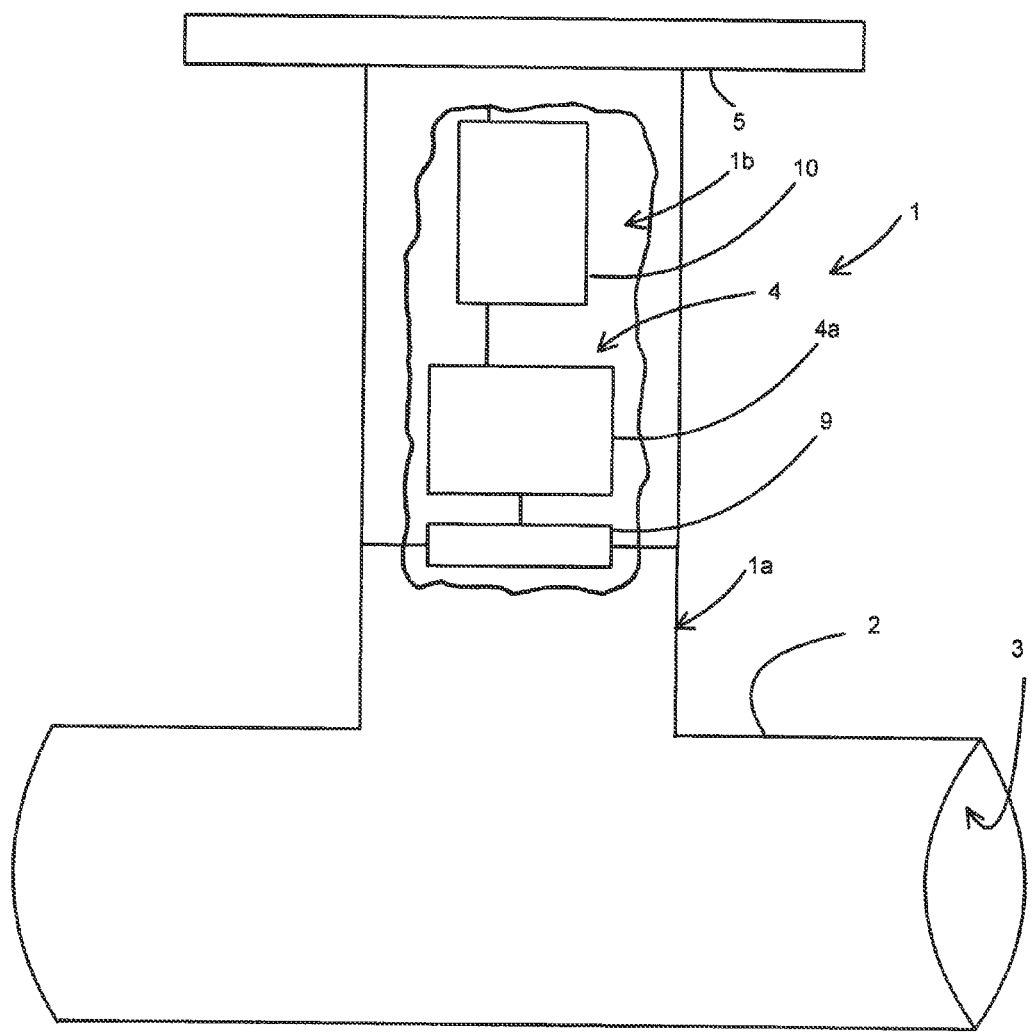
FIG. 1 shows a diagrammatic side view, part cut-away, of a device embodying the invention.
Figure 2:
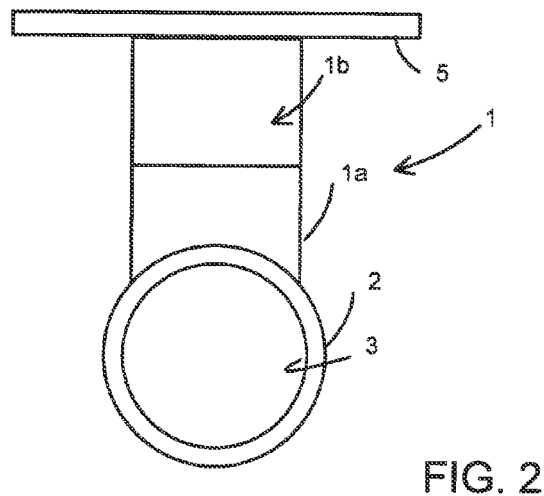
FIG. 2 shows a diagrammatic end view of the device shown in FIG. 1.
Figure 3:
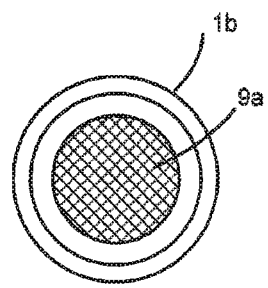
FIG. 3 shows a diagrammatic view into an acoustic generator chamber of a device embodying the invention to illustrate the location of a loudspeaker.

Referring now to the drawings, FIGS. 1 to 3 show diagrammatic illustrations of one example of a device 1 embodying the invention for repelling or deterring an animal from remaining within a subterranean tunnel system in which the device is installed.

As shown by FIGS. 1 and 2, in this example the device 1 comprises a housing 1a defining a pipe 2 providing an acoustic tube or passage 3 and a tubular compartment or chamber 1b that contains an acoustic generator 4 having an acoustic generator unit 4a, a battery 10 and a loudspeaker 9. The acoustic tube 3 is acoustically coupled to the acoustic generator 4.

The housing 1a may carry a solar panel 5 to enable the device to derive at least part of its power supply from sunlight during daylight hours. Any derived solar power may be used to charge the battery 10.

In the example shown by FIGS. 1 to 3, the longitudinal axis of hollow acoustic tube 2 extends transversely of that of the reminder of the housing so that the housing has a T shape with the hollow acoustic tube 2 extending at an angle of 90° to the reminder of the housing. The chamber 1b is sealed against the weather and is designed to resist damage by animals. The hollow acoustic tube 2 and chamber 1b form a sealed unit which is weather-resistant and is resistant to damage by the environment within which it is to be used and is resistant to damage caused by animals such as those to be deterred. The housing is in this example formed of a weather resistant plastics material which is virtually unbreakable, an example of such a plastics material is rigid PVC-U (polyvinyl chloride-unbreakable).

Figure 5:
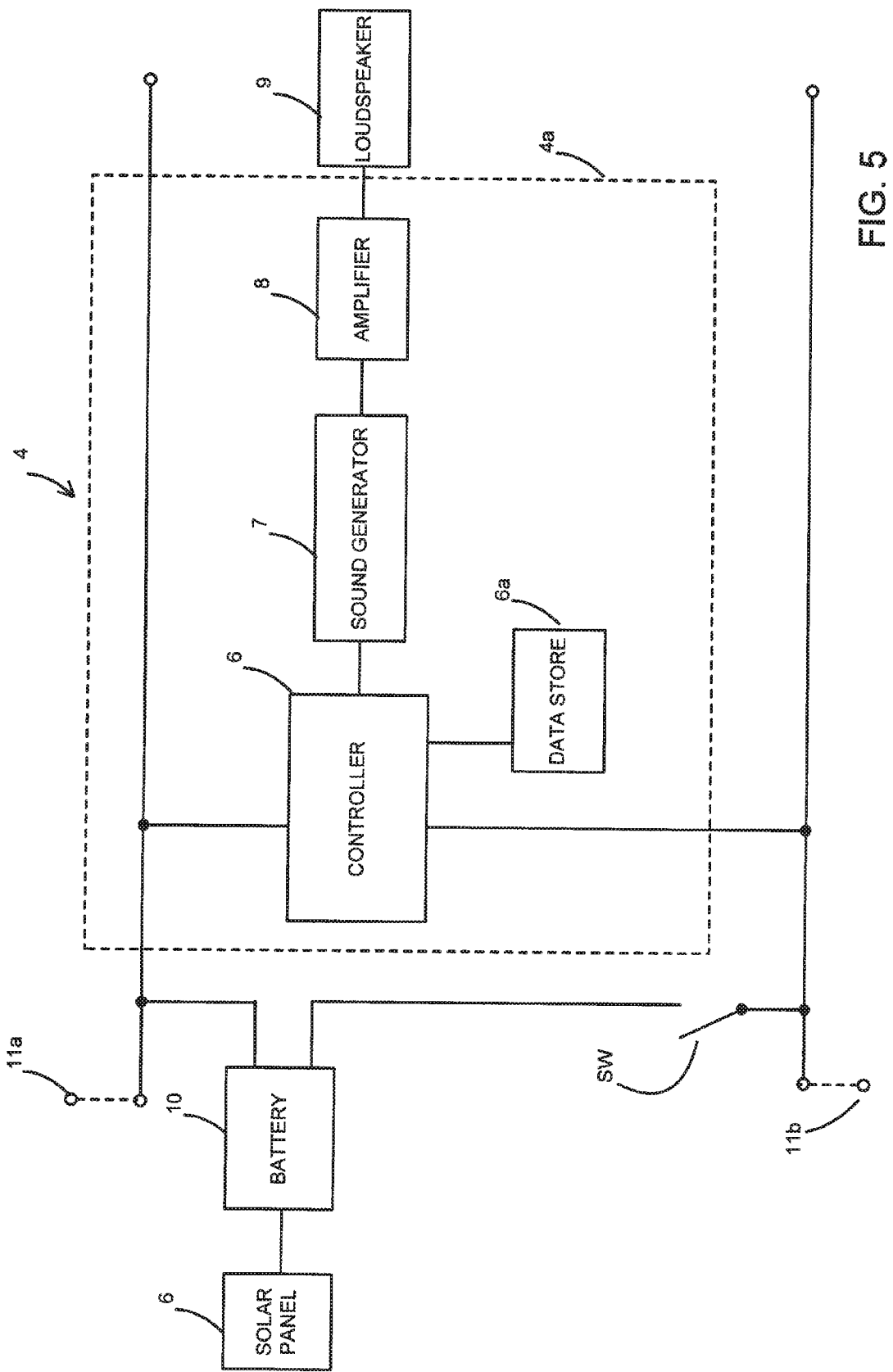
FIG. 5 shows a block diagram of functional components of a device embodying the invention.

FIG. 5 shows a block diagram of one example of the functional components of the device 1.

In this example, the acoustic generator unit 4a comprises a controller 6 coupled to an input of a sound generator 7 having an output coupled to an amplifier 8. The controller 6 is coupled to a data store 6a that stores one or more acoustic data files. The amplifier 8 is coupled to the loudspeaker 9. The loudspeaker 9 may be any suitable form of loudspeaker. In this example, the loudspeaker 9 is a metal calotte (encased) loudspeaker having a speaker grille 9a (FIG. 3) which separates the chamber 1b from the passage 3 defined by the hollow acoustic tube 2. However any suitable loudspeaker may be used.

In this example, the loudspeaker 9 is arranged to direct sound waves into the acoustic passageway at an angle of 90° to a longitudinal axis of the acoustic tube 2. This enables better protection against damage by animals.

In the example being described, the device 1 is powered by solar power and/or a rechargeable battery 10. The rechargeable battery 10 is coupled to the solar panel 5 to enable the battery to be charged by solar energy. In the interests of clarity not all of the couplings to the battery 10 are shown in FIG. 5.

As an alternative or additional possibility, the device may as shown in FIG. 5 have couplings 11a and 11b, generally low voltage connections, to enable the battery 10 to be charged by an external charging unit. As a further possibility, the battery may be replaced or supplemented by a weather-resistant power supply unit (not shown) such as an AC adapter coupled to the couplings 11a and 11b. As another possibility, an accumulator may be used instead of the rechargeable battery. As another possibility a non-rechargeable battery may be used. Any one or any combination of these power supplies may be used.

In the interests of clarity not all of the couplings to the battery 10 are shown in FIG. 5.

As shown in FIG. 5, the power supply (the battery in FIG. 5) may be coupled to the acoustic generator 4 by a switch SW to enable the power supply to be disconnected, for example for maintenance.

It will be appreciated that any acoustic generator unit 4a may be used. The functional components of the acoustic generator unit 4a may be implemented by one or more circuit boards. As an example, a commercially available MP3 (or other music data file format) music player may be used to implement the controller 6, data store 6a and sound generator 7 and perhaps also the amplifier 9. As another possibility a separate digital sound module and an SMD (Surface Mount Device) ship fog horn noise generator may be used.

Figure 6:
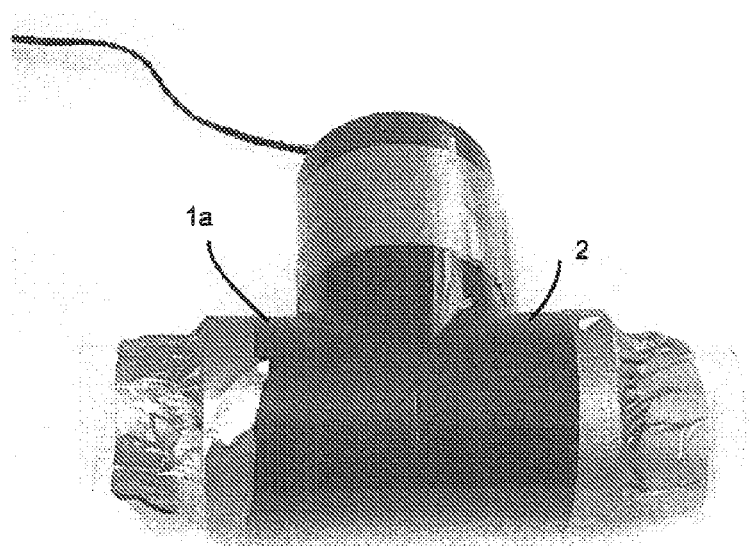
FIG. 6 shows a perspective view of an experimental device embodying the invention.
Figure 7:
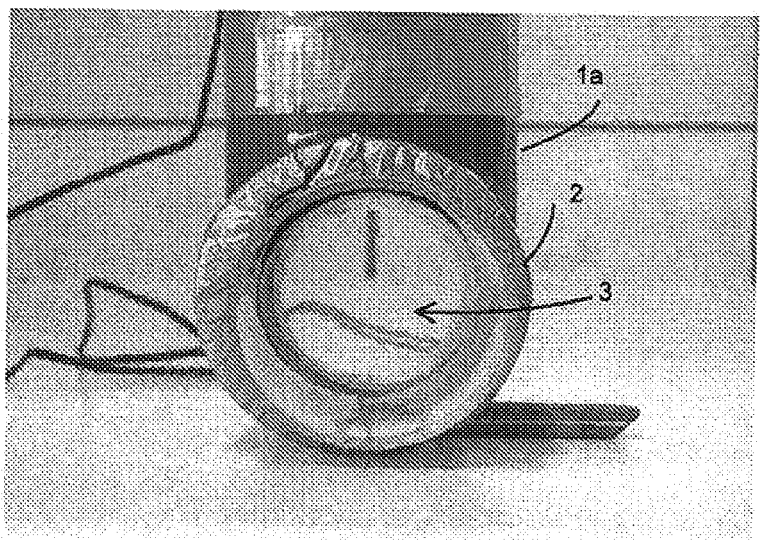
FIG. 7 shows a side view looking into an acoustic tube or tunnel provided by the experimental device shown in FIG. 4.
Figure 8:
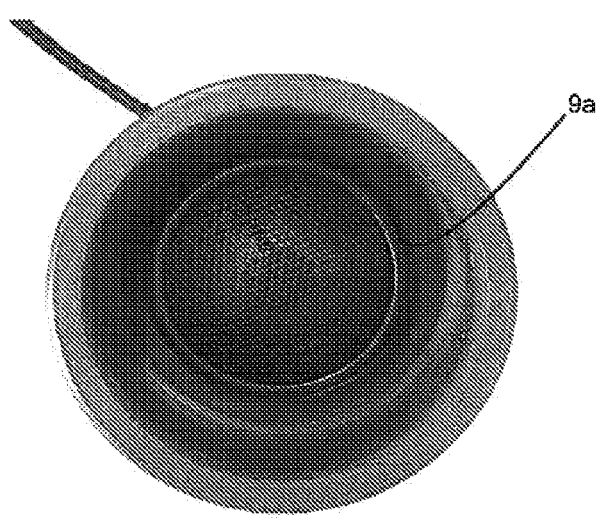
FIG. 8 shows a view looking at a loudspeaker grille of an acoustic generator of the experimental device shown in FIG. 6.

FIGS. 6 to 8 show views of an experimental example of the device 1 shown diagrammatically in FIGS. 1 to 3 with FIG. 6 showing a perspective view of the device, FIG. 7 showing a side view looking into the acoustic tube of the device and FIG. 8 showing a view looking at a loudspeaker grille 9a of the device.

The data store 6a stores acoustic or audio data that represents an acoustic signal that acts to repel an animal of a species that inhabits a subterranean tunnel system, such as a water vole or mole. In this example, the acoustic signal mimics one or more deterrent communication calls of the species in question to cause the animal to vacate the location of the acoustic signal and to vacate the subterranean tunnel system.

The acoustic signal may be obtained by recording the actual communication call or calls of the animal concerned. This may be achieved by provoking a member of the species concerned into uttering the call or calls. Where the acoustic generator comprises a commercial audio player with recording facilities, it may be possible to record the communication call(s) directly into the data store. As another possibility, a recorded acoustic signal may be downloaded to the data store from a separate recording device.

As a further possibility, a conventional sound synthesizer may be used to provide a synthesized representation of the communication call or calls.

The acoustic signal may be stored in the data store 6a in any appropriate audio data file format, for example the WAV format. The acoustic signal may be compressed using any appropriate lossy or lossless compression algorithm, compatible with the acoustic generator, to reduce the amount of data storage space required. The acoustic signal may for example be stored in MP3 format.

Animal bioacoustics comprise all noises created in living nature; it particularly relates to the teaching of the use of sound by animals and the sound effect upon them (in Gattermann, 2006 "Wörterbuch zur Verhaltensbiologie der Tiere und des Menschen", $2^{nd}$ Edition, Spektrum Akademischer Verlag, as Imprint of Elsevier GmbH.) In species living in social communities, bio-acoustic communication leads, for example, to warnings about enemies or serves to organize social communities. Water voles and moles are two subterraneous species which are characterized by their overwhelmingly solitary lifestyle. Even in this social organization, the inter-species understanding via acoustic communication plays a role, in addition to other influences. Here, communicative elements can take the place of a distance-regulating effect.

Where the animal to be deterred is an animal, such as a water vole or mole, that does not normally tolerate the proximity of other members of its species except during the mating season or where those members are its own non-adult offspring, the acoustic signal may represent a distance-regulating or territorial sound (such as the grinding of teeth). The communication call or calls may alternatively or additionally represent a defensive sound or sounds (such as short sounds) that alert other members of the species to the presence of a threat such as a predator.

In an example, sounds may be artificially paired or combined. Thus, different deterrent calls of the same species, for example the defensive and territorial calls of a water vole or of a mole, may be combined in a single acoustic signal so that the different calls occur one after another or in a set sequence or in a random sequence in the combined signal.

The controller 6 may be configured to cause the acoustic signal to be emitted continuously as if it were on continuous loop or intermittently, for example at periodic or random intervals, or at predetermined times, depending upon requirements.

Figure 4:
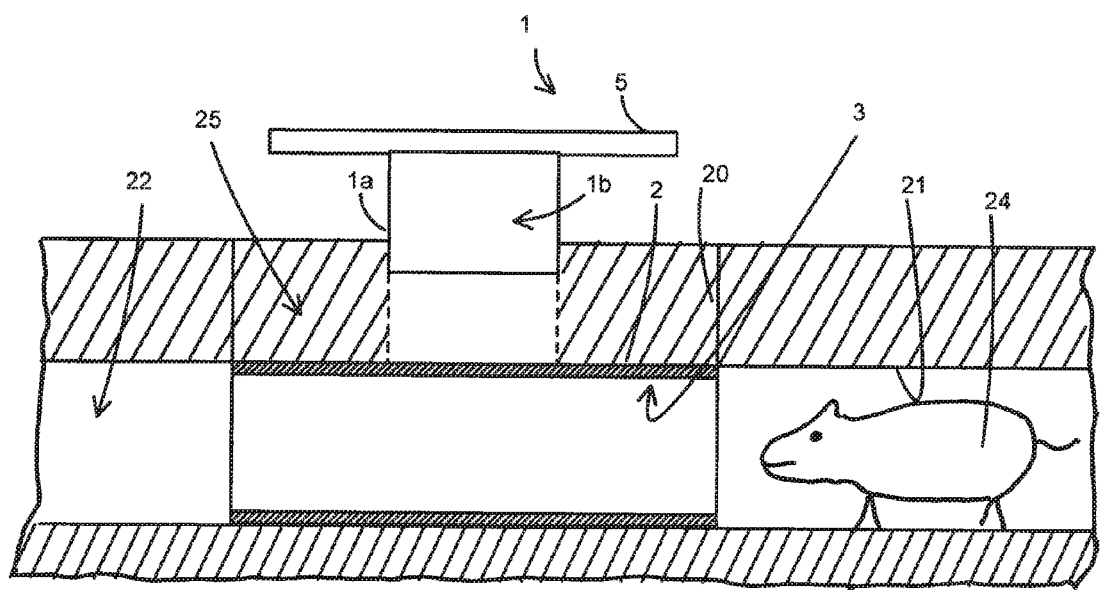
FIG. 4 shows a diagrammatic side view, part cut-away, illustrating a device embodying the invention in place within a tunnel of a subterranean tunnel system.

A device as described above may be installed in the subterranean tunnel system of the animal to be deterred. In order to do this, as illustrated by FIG. 4, a sectional opening 20 is made into a tunnel 21 of a subterranean tunnel system 22 of the animal 24 to be repelled or deterred, the device 1 is inserted into the opening so that the acoustic tube 2, and therefore the passage 3, extends along the tunnel 21 and the compartment 1b extends above the level of the ground (to enable its location to be ascertained and to enable use of solar power as a power source, if the device is provided with a solar panel 5 as shown in FIG. 4). The opening 20 is then back-filled with the removed particulate material 25 (soil, dirt, sand, clay, depending upon the terrain) so that the device is surrounded by the particulate material to inhibit the possibility of draft or wind entering the tunnel system. In this example, the acoustic tube passage 3 is of circular cross section and of a diameter similar to or the same as that of the tunnel 21 and so creates an artificial tunnel section through which the animal may move unhindered. Such an open-ended tube also allows sound to be transmitted in both directions along the tube and into the tunnel. In this way, the acoustic tube passage becomes a part of the tunnel system. In an embodiment, the acoustic tube may have a passage with a diameter of from about 40 mm to about 80 mm, for example preferably 55 mm, although this will of course depend upon the tunnel size of the species to be deterred.

In operation of the above device, once the switch SW (if present) is closed, the controller 6 causes the sound generator 7 to generate an audio data signal in accordance with an audio data read from the data store 6a. The audio data signal is amplified by the amplifier 8 and supplied to the loudspeaker 9 which emits an acoustic signal (which as mentioned above represents a deterrent call or calls of the species to be repelled) into the acoustic tube passage 3 and so in the subterranean tunnel system to deter or repel an inhabitant of the subterranean tunnel system. The controller 6 may cause the loudspeaker 9 to emit the acoustic signal continuously as if it were on continuous loop or intermittently, for example at periodic or random intervals, or at predetermined times, depending upon requirements.

Figure 11:
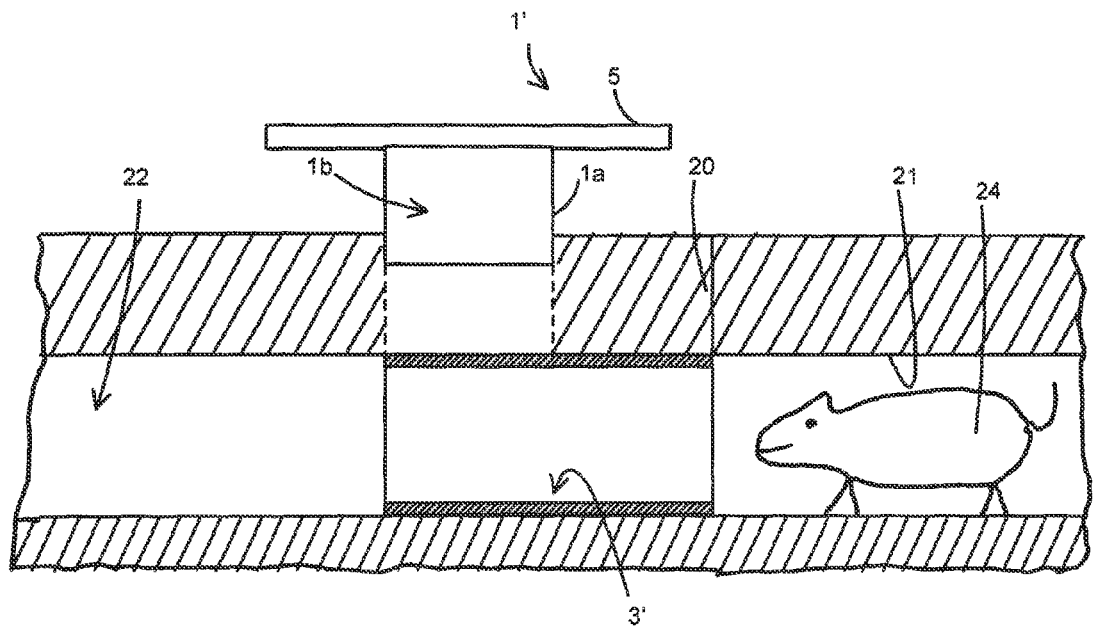
FIGS. 11 and 12 show diagrammatic side views, part cutaway, illustrating other examples of devices embodying the invention in place within a tunnel of a subterranean tunnel system.

In the example described above, the device has a T shape, so the device has an axis of symmetry about a tubular housing portion providing the chamber 1b containing the acoustic generator 4. As another possibility, the chamber 1b may be offset so that the crossbar of the T shape is longer on one side than the other, or extends only on one side to form an L-shape, rather than a T-shape. An example of a device 1' having an L-shape configuration (that is with the acoustic passage 3' offset from the chamber 1b) located in a subterranean tunnel system is shown in FIG. 11.

In the examples described above, the acoustic passage 3 or 3' may form a tunnel termination in which case one end of the acoustic passage 3 or 3' will be closed to provide that termination. Generally, an L-shape configuration will be used where the acoustic passage forms a tunnel termination.

Figure 12:
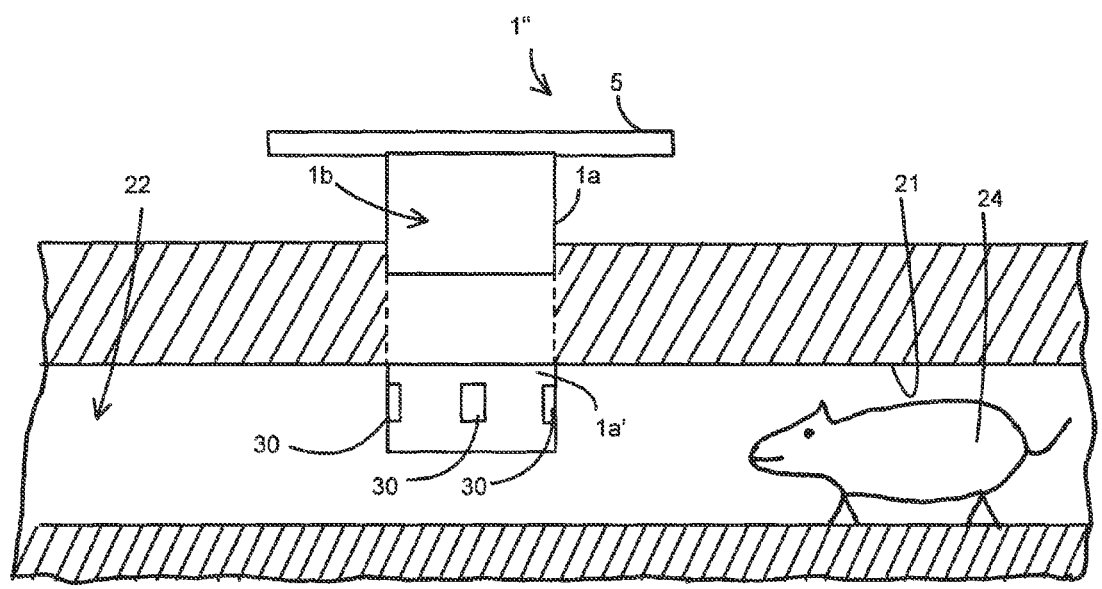

As described above, the passage 3 through the acoustic tube 2 appears to the inhabitant of the tunnel as part of its tunnel system. As another possibility, the device may comprise a closed tube or rod that has apertures through which sound waves may be emitted directly into a subterranean tunnel system when the closed tube or rod is inserted into a tunnel of that subterranean tunnel system. FIG. 12 shows a view similar to FIG. 11 of a device in place in a tunnel of a subterranean tunnel system in which the hollow acoustic tube is replaced by a closed extension 1a' of the chamber 1b so that the device comprises a rod or closed pipe 1a', 1b. This device is inserted into the tunnel system so that the closed extension 1a' extends into a tunnel and one or more apertures 30 in the closed extension 1a' allow sound emitted by a loudspeaker within the closed extension to be emitted directly into the tunnel. The closed extension may allow an inhabitant of the tunnel to move through the tunnel past the device as illustrated in FIG. 12, or it may obstruct the tunnel.

The above-described devices can thus be located so as to emit sound directly into the subterranean tunnel system of the species to be deterred and the acoustic signal emitted by the device travels further than it would if it were being directed into the surrounding ground or earth. The emitted sound may cause the animals to leave that subterranean tunnel system and to relocate to a different place within the habitat, where they dig a new subterraneous tunnel system.

Behavior Studies

As mentioned above, an example of a species that lives in a subterranean tunnel system is the water vole. According to present teachings, a water vole predominantly lives solitarily in its subterranean tunnel system. Only during the mating season do female adults tolerate male adults in their subterranean tunnel system for the purpose of procreation. Furthermore, the female adult tolerates its progeny in its own subterranean tunnel systems only whilst they are still dependent upon her. Once her progeny become independent, the female adult no longer tolerates her progeny and migration occurs. Theoretical socio-biological parent strategies suggest that only female sub-adults can inherit the habitat of their mother, although overlapping subterranean tunnel systems are possible (Eckart Voland, "Grundriss der Soziobiologie", 2. Auflage 2000, Spektrum Akademischer Verlag GmbH Heidelberg, Berlin).

The effectiveness of the above-described approach on a sample of N (in the test ten) water voles was tested in the laboratory. Acoustic tubes as described above and as illustrated in FIGS. 6 to 8 were incorporated into the arms of a T-maze and an animal cage was coupled to the T-maze by a tube. The acoustic tubes were fitted with silencers. The behavior of water voles released into that T-maze was monitored over a ten-day trial period. A statistical analysis was carried out and reviewed using a Wilcoxon test (Table 1). In order to review the stress parameters, a corticosteron metabolite was monitored. For this purpose, at different phases of the experiment, samples of feces from the T-maze were collected for analysis.

Figure 9:
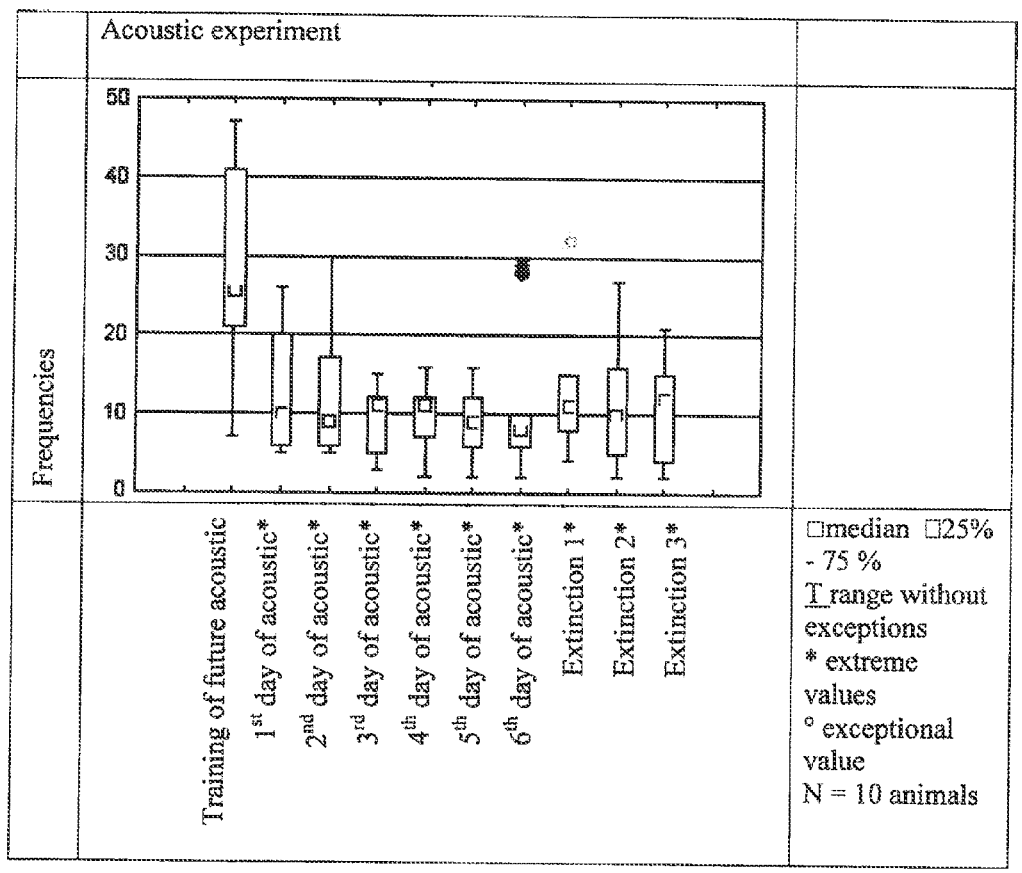
FIG. 9 shows a graphical representation of the repelling effect in lab experiments on individual water voles.

FIG. 9 shows a graph illustrating the effect of a device embodying the invention on the distribution of the water voles in a T-maze.

The data in FIG. 9 show the frequency (number) of runs by the water voles into tubes of the T-maze in different phases. The first phase ("training of future acoustic") is a phase during which no acoustic signal was present and so is the phase in which the voles are acclimatizing to the T-maze and thus provides a control for a behaviour study. This first phase lasted one day. The number of runs (frequencies) into the tubes of the T-maze during this first phase were counted as were the number of runs into the tubes of the T-maze on $1^{st}$ to $6^{th}$ days for which the acoustic signal was present and as were the number of runs for three days after the acoustic signal had been stopped (extinction 1, 2 and 3 where "extinction" is the dying away of an animal's response to a primary stimulus (an unconditioned stimulus))

During the entire period the acoustic signal was present, all of the animals showed repellent behavior by avoiding the device; and after the acoustic signal was turned off ("extinction"), the animals continued to avoid the device.

Table 1 below shows the results of the Wilcoxon Test:

| | Paired sample Wilcoxon tests (crude data) marked tests significant beginning at $p < .05000$ | | | |
|---|---|---|---|---|
| Pair of variables | Valid N | T | Z | P - level |
| Familiarization, future acoustic signal & $1^{st}$ day of acoustic signal* | 10 | 0.000000 | 2.803060 | 0.005062 |
| Familiarization, future acoustic signal & $2^{nd}$ day of acoustic signal* | 10 | 0.000000 | 2.803060 | 0.005062 |
| Familiarization, future acoustic signal & $3^{rd}$ day of acoustic signal* | 9 | 1.000000 | 2.547100 | 0.010863 |
| Familiarization, future acoustic signal & $4^{th}$ day of acoustic signal* | 9 | 0.000000 | 2.520504 | 0.011719 |
| Familiarization, future acoustic signal & $5^{th}$ day of acoustic signal* | 9 | 0.000000 | 2.665570 | 0.007686 |
| Familiarization, future acoustic signal & $6^{th}$ day of acoustic signal* | 10 | 3.000000 | 2.497271 | 0.012516 |
| Familiarization, future acoustic signal & extinction 1* | 10 | 2.000000 | 2.599201 | 0.009345 |
| Familiarization, future acoustic signal & extinction 2* | 10 | 3.000000 | 2.497271 | 0.012516 |
| Familiarization, future acoustic signal & extinction 3* | 10 | 2.000000 | 2.599201 | 0.009345 |

Figure 10:
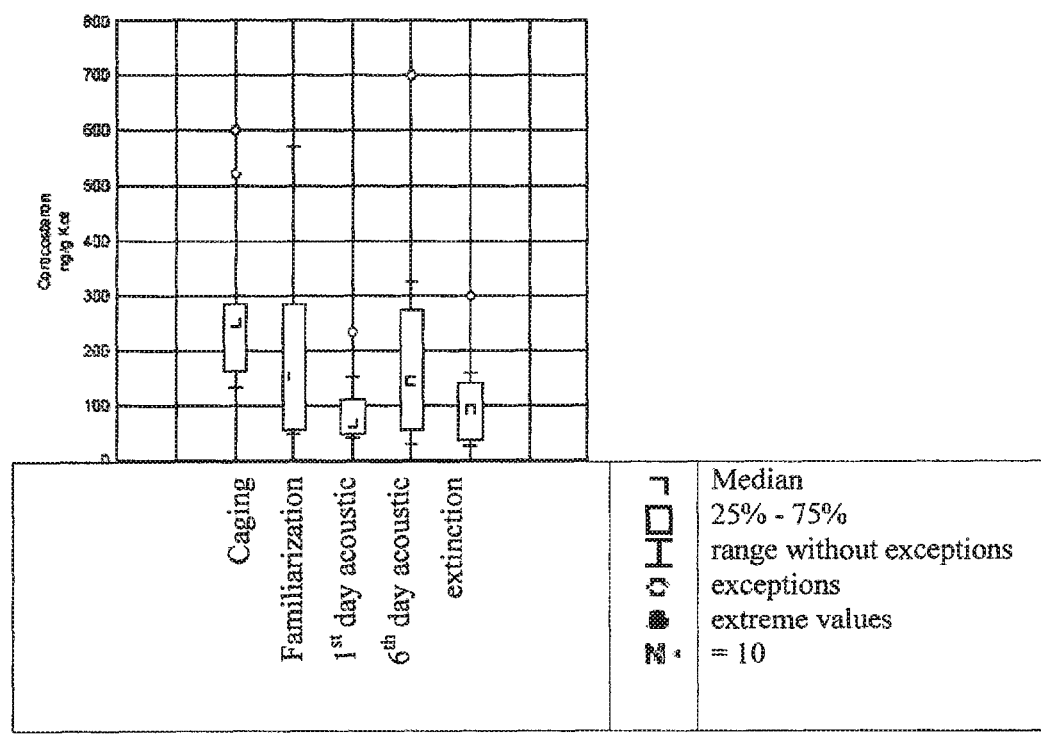
FIG. 10 shows a graphical representation of the measured stress level (in Corticosteron in ng/g feces) in lab experiments on individual water voles.

FIG. 10 shows a graph illustrating on the y axis the level of stress hormone which gives an indication of the physiological reaction of the voles to the T-maze. In this test the stress hormone measured was corticosteron with a 5β-3a, 11β diol structure. The stress hormone levels were determined non-invasively from excrement (feces) samples. The level of stress hormone is indicated in FIG. 10 in nanograms (ng) of Corticosteron per gram of feces. The level of stress hormone was determined in the different phases of the experiment, in particular: 1) the 24 hour period during which the animals were caged under normal housing conditions in a holding room before introduction to the T-maze (caging); 2) once they had become familiar with their new environment (familiarization), that is 24 hours after introduction to the T-maze; 3) on the $1^{st}$ day upon which they were subjected to the acoustic signal output from a device embodying the invention; 4) on the 6th day upon which they were subjected to the acoustic signal output from a device embodying the invention; and 5) when the acoustic signal has stopped with the last sample being taken 72 hours after the acoustic signal had stopped. 24 hours before feces samples were taken the tubes were cleaned of any old feces In order to check the effectiveness of the device under field conditions, 12 water voles were equipped with collar transmitters and each consecutively monitored in an open-air enclosure (14.5×29 m) in a two-week behavioral test. During the first week of this test, radio-telemetry was used to determine the location at which the animals dug their tunnel system and if they stayed there predominantly. In the second week, a T-shape tube device as shown in FIG. 1 placed in the tunnel system was activated to produce the same acoustic signal as used for the laboratory tests in the T-maze, and the location (of the animals) again was recorded using the same method. The test period ranged from November 2008 to October 2009. The results are shown in Table 2.

TABLE 2

| Repelling reactions in the trial of individual animals | | | | |
|---|---|---|---|---|
| Month | Animal | Gender | Repellant | Died |
| November | 6217 | W | + | |
| March | 6260 | W | + | |
| April | 6618 | M | + | |
| May | 5890 | W | − | |
| May | 6066 | M | + | |
| June | 6067 | M | − | |
| June | 6215 | M | −− | Yes |
| July | 6800 | M | + | |
| July | 6722 | W | + | |
| August | 5887 | M | − | |
| September | 6069 | W | + | |
| October | 6775 | M | + | |

Where W represents a female and M a male and where + indicates repellent activity (a repellent reaction occurring within 24 hours with the animal changing location) whilst − indicates that the animal showed no clear reaction and did not leave the location.

In another test the open-air enclosure was divided into two sections by erecting a migration barrier. Two groups of four animals each were equipped with transmitters and treated similarly to the individual test. The test period ranged from the middle of October to the middle of November 2009. The results are shown in Table 3.

TABLE 3

Repelling reaction in the group test

| Group | Animal | Gender | Repellant | Died |
|-------|--------|--------|-----------|------|
| A | 7340 | W | + | |
| A | 7342 | M | + | |
| A | 7344 | M | + | |
| A | 7346 | W | + | |
| B | 7345 | M | -- | Yes |
| B | 7348 | W | - | |
| B | 7349 | M | + | |
| B | 7350 | W | -- | Yes |

In the individual test, after displacement, the repelled animals dug a new tunnel system at another site in the open-air enclosure. Only in a single case was the old tunnel system reoccupied after displacement.

An embodiment provides a device having a weather-resistant housing 1a, 1b providing a chamber 1b containing an acoustic generator 4. An acoustic outlet 2 is located, in use, to direct an acoustic signal into air of the animal tunnel/burrow system rather than into ground/soil. The acoustic outlet may be an acoustic tube that in use extends along a tunnel of a subterranean tunnel system of the species to be deterred so as to form part of that tunnel. The device may be powered by a battery 10. A part of the device that extends above the ground may support a solar panel 5. The acoustic signal represents one or more deterrent communication calls of the species to be deterred. In the case of a water vole or mole, the acoustic signal represents one or more of a distance regulating or territorial call and a defensive call. Two such communication calls may be artificially paired to form the acoustic signal.

The devices described above are configured to emit an acoustic signal into a tunnel of a subterranean tunnel system of the species to be deterred. As another possibility, any of the devices described above may be used above ground so as to direct the deterrent signal into the air.

A device embodying the invention may have any appropriate shape; the described T- and L-shapes are only examples. A device embodying the invention may include sound directors in the form of baffles or sound guiding pipes to guide the emitted sound to a particular location or locations remote from the loudspeaker.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The Disclosure of this Application Also Includes the Following Numbered Clauses

1. A method of repelling or deterring a member of given animal species from a location, which method comprises causing an acoustic generator to emit an acoustic signal which mimics a deterrent communication call of that animal at that location.

2. A method of repelling or deterring a member of given animal species from a tunnel of a subterranean tunnel system, which method comprises causing an acoustic generator to emit an acoustic signal which mimics a deterrent communication call of that animal into a tunnel of the tunnel system.

3. A method according to Clause 1 or 2, wherein the acoustic signal mimics a combination of deterrent communication calls of the given species. 4. A method according to Clause 1 or 2, wherein emitting an acoustic signal which mimics a deterrent communication call comprises emitting an acoustic signal which mimics at least one of a distance-regulating communication call and a defensive call of the given species. 5. A method according to Clause 1 or 2, wherein the given species is a water vole and the method comprises emitting an acoustic signal that mimics at least one of a distance-regulating communication call and a defensive call of the water vole. 6. A method according to Clause 1 or 2, wherein the given species is a mole and the method comprises emitting an acoustic signal that mimics at least one of a distance-regulating communication call and a defensive call of the mole.

7. A method of repelling or deterring a water vole from at least a tunnel of a subterranean tunnel system that it inhabits, which method comprises causing an acoustic generator to emit an acoustic signal which mimics at least one deterrent communication call of the water vole into the tunnel of the tunnel system.

8. A method according to Clause 7, wherein emitting an acoustic signal which mimics a deterrent communication call comprises emitting an acoustic signal which mimics a distance-regulating communication call of the water vole. 9. A method according to Clause 7 or 8, wherein the given species is a water vole and the method comprises emitting an acoustic signal that mimics a defensive communication call of the water vole. 10. A method according to Clause 7 wherein emitting an acoustic signal which mimics a deterrent communication call comprises emitting an acoustic signal which mimics both a distance-regulating communication call and a defensive communication call of the water vole. 11. A method according to any preceding clauses, wherein the acoustic generator stores audio data representing the acoustic signal. 12. A method according to Clause 11, wherein the audio data is derived by recording the communication call or calls of a member of the animal species. 13. A method according to Clause 11, wherein the audio data comprises synthesized audio data representing the communication call or calls of a member of the animal species. 14. A method according to Clause 11, 12 or 13, wherein the audio data comprises compressed audio data.

15. A device for deterring or repelling a member of given animal species from a location, which device comprises a housing having a chamber containing an acoustic generator to emit an acoustic signal which mimics a deterrent communication call of that animal, the housing having an acoustic outlet to direct the acoustic signal into air at the location.

16. A device for deterring or repelling a member of given animal species from a tunnel of a subterranean tunnel system, which device comprises a housing having a chamber containing an acoustic generator, the chamber being coupled to an acoustic outlet configured to be introduced into a said tunnel, the acoustic generator being arranged to emit an acoustic signal into the tunnel to deter or repel member of that animal species from at least that tunnel of the subterranean tunnel system.

17. A device according to Clause 16, wherein the acoustic outlet comprises an acoustic passage provided by the housing, which passage has at least one open end and which passage is configured to be located within a said tunnel. 18. A device according to Clause 17, wherein the passage extends transversely of the chamber containing the acoustic generator. 19. A device according to Clause 17, wherein the passage extends transversely of the chamber containing the acoustic generator to define an L or T shape. 20. A device according to Clause 17, 18 or 19, wherein the passage is designed to form part of the tunnel so that an animal of said species can pass into the passage. 21. A device according to Clause 16, wherein the acoustic outlet comprises one or more apertures located in a portion of the housing designed to be received within a said tunnel. 22. A device according to any of clauses 16 to 21, wherein the acoustic generator has a loudspeaker positioned at the entrance to the acoustic outlet so as to direct sound into the acoustic outlet. 23. A device according to any of clauses 16 to 21, wherein the acoustic generator has a loudspeaker positioned so as to direct sound into the acoustic outlet at 90° to a longitudinal axis of the acoustic outlet. 24. A device according to any of clauses 15 to 23, wherein the acoustic generator is arranged to emit an acoustic signal which mimics at least one deterrent communication call or a combination of deterrent communication calls of the given species. 25. A device according to any of clauses 15 to 23, wherein the acoustic generator is arranged to emit an acoustic signal which mimics at least one of or a combination of a distance-regulating communication call and a defensive call of the given species. 26. A device according to any of clauses 15 to 23, wherein the acoustic generator is arranged to emit an acoustic signal which mimics at least one of or a combination of a distance-regulating communication call and a defensive call of a water vole. 27. A device according to any of clauses 15 to 23, wherein the acoustic generator is arranged to emit an acoustic signal which mimics at least one of or a combination of a distance-regulating communication call and a defensive call of a mole. 28. A device according to any of clauses 15 to 27, wherein the acoustic generator comprises a data store to store audio data representing the acoustic signal. 29. A device according to Clause 28, wherein the audio data comprises audio data representing or derived from a recording of the communication call or calls of a member of the animal species. 30. A device according to Clause 28, wherein the audio data comprises synthesized audio data representing the communication call or calls of a member of the animal species. 31. A device according to Clause 28, 29 or 30, wherein the audio data comprises compressed audio data. 32. A device according to any of clauses 15 to 31, wherein the acoustic generator comprises an amplifier to amplify the acoustic signal. 33. A device according to any of clauses 15 to 32, wherein the acoustic generator comprises a controller to cause the acoustic generator to emit the acoustic signal periodically, at intervals, or continuously. 34. A device according to any of clauses 15 to 33, wherein the device is battery powered. 35. A device according to any of clauses 15 to 34, further comprising a solar panel mounted to the chamber to provide a power supply. 36. A device according to any of clauses 15 to 35, further comprising a coupling to connect the device to a power supply external to the device. 37. A device according to any of clauses 15 to 36, wherein, in use of the device, at least a part of the chamber extends above a surface of the ground at the location. 38. A device according to any of clauses 15 to 37, wherein the housing is formed of a weather-resistant plastics material.

39. A method of installing a device according to any of clauses 15 to 38, which method comprises:

forming an opening through the ground into a tunnel of a subterranean tunnel system of the animal to be repelled or deterred;

inserting the device into the opening so that the acoustic outlet extends into the tunnel and so that at least part of the chamber containing the acoustic generator extends above the ground; and back filling the opening so that the device is surrounded by particulate material and the acoustic outlet resides within or forms part of said tunnel.

What is claimed is:

1. A device for deterring or repelling a member of a given animal species from a tunnel of a subterranean tunnel system, comprising:
    a housing having a first housing portion defining a chamber comprising an acoustic generator and a second housing portion defining a passage acoustically coupled to the acoustic generator, the second housing portion being configured to form part of a tunnel of a subterranean tunnel system so that a member of an animal species can pass along the passage, the acoustic generator being arranged to emit an acoustic signal into the passage and into the tunnel to deter or repel the member of the animal species from at least the tunnel of the subterranean tunnel system.

2. A device according to claim 1, wherein the acoustic generator is arranged to emit an acoustic signal selected from the group consisting of:
    an acoustic signal which mimics at least one deterrent communication call or a combination of deterrent communication calls of the given species;
    an acoustic signal which mimics at least one of or a combination of a distance-regulating communication call and a defensive call of the given species;
    an acoustic signal which mimics at least one of or a combination of a distance-regulating communication call and a defensive call of a water vole; and
    an acoustic signal which mimics at least one of or a combination of a distance-regulating communication call and a defensive call of a mole.

3. The device according to claim 1, wherein the acoustic generator comprises a data store to store audio data representing the acoustic signal.

4. The device according to claim 1, wherein the audio data is selected from the group consisting of:
    audio data representing or derived from a recording of the communication call or calls of a member of the animal species;
    synthesized audio data representing the communication call or calls of a member of the animal species;
    compressed audio data; and
    combinations of audio data representing or derived from a recording of the communication call or calls of a member of the animal species, synthesized audio data representing the communication call or calls of a member of the animal species and compressed audio data.

5. The device according to claim 1, wherein the acoustic generator comprises at least one of an amplifier to amplify the acoustic signal, and a controller to cause the acoustic generator to emit the acoustic signal periodically, at intervals, or continuously.

6. The device according to claim 1, further comprising at least one of:
    a battery powered supply;
    a solar panel mounted to the chamber to provide a power supply; and a coupling to connect the device to a power supply external to the device.

7. The device according to claim 1, wherein, in use of the device, at least a part of the chamber extends above a surface of the ground at the location.

8. The device according to claim 1, wherein the housing is formed of a weather-resistant plastics material.

9. The device according to claim 1, wherein at least one of:
the passage has one open end;
the passage extends transversely of the chamber comprising the acoustic generator;
the passage extends transversely of the chamber comprising the acoustic generator to define an L or T shape; and
the passage is a through passage through which a member of the species can pass.

10. The device according to claim 1, wherein the housing comprises an acoustic outlet comprising one or more apertures located in a portion of the housing designed to be received within the tunnel.

11. The device according to claim 1, wherein the housing comprises an acoustic outlet, and the acoustic generator has a loudspeaker positioned so as to at least one of:
be at the entrance to the acoustic outlet so as to direct sound into the acoustic outlet; and
direct sound into the acoustic outlet at 90° to a longitudinal axis of the acoustic outlet.

12. A method of installing a device for deterring or repelling a member of a given animal species from a tunnel of a subterranean tunnel system, the device comprising a housing having a first housing portion defining a chamber comprising an acoustic generator and a second housing portion defining a passage acoustically coupled to the acoustic generator, the second housing portion being configured to form part of a tunnel of the subterranean tunnel system so that a member of the animal species can pass along the passage, and the acoustic generator being arranged to emit an acoustic signal into the passage and into the tunnel to deter or repel the member of the animal species from at least the tunnel of the subterranean tunnel system, the method comprising:
forming an opening through the ground into a tunnel of a subterranean tunnel system of the animal to be repelled or deterred;
inserting the device into the opening so that an acoustic outlet of the housing extends into the tunnel and so that at least part of the chamber comprising the acoustic generator extends above the ground; and
back filling the opening so that the device is surrounded by particulate material and the acoustic outlet resides within or forms part of the tunnel.

* * * * *